July 16, 1929.     G. B. COLEMAN     1,721,432
TRANSMISSION
Filed Sept. 29, 1925     5 Sheets-Sheet 5
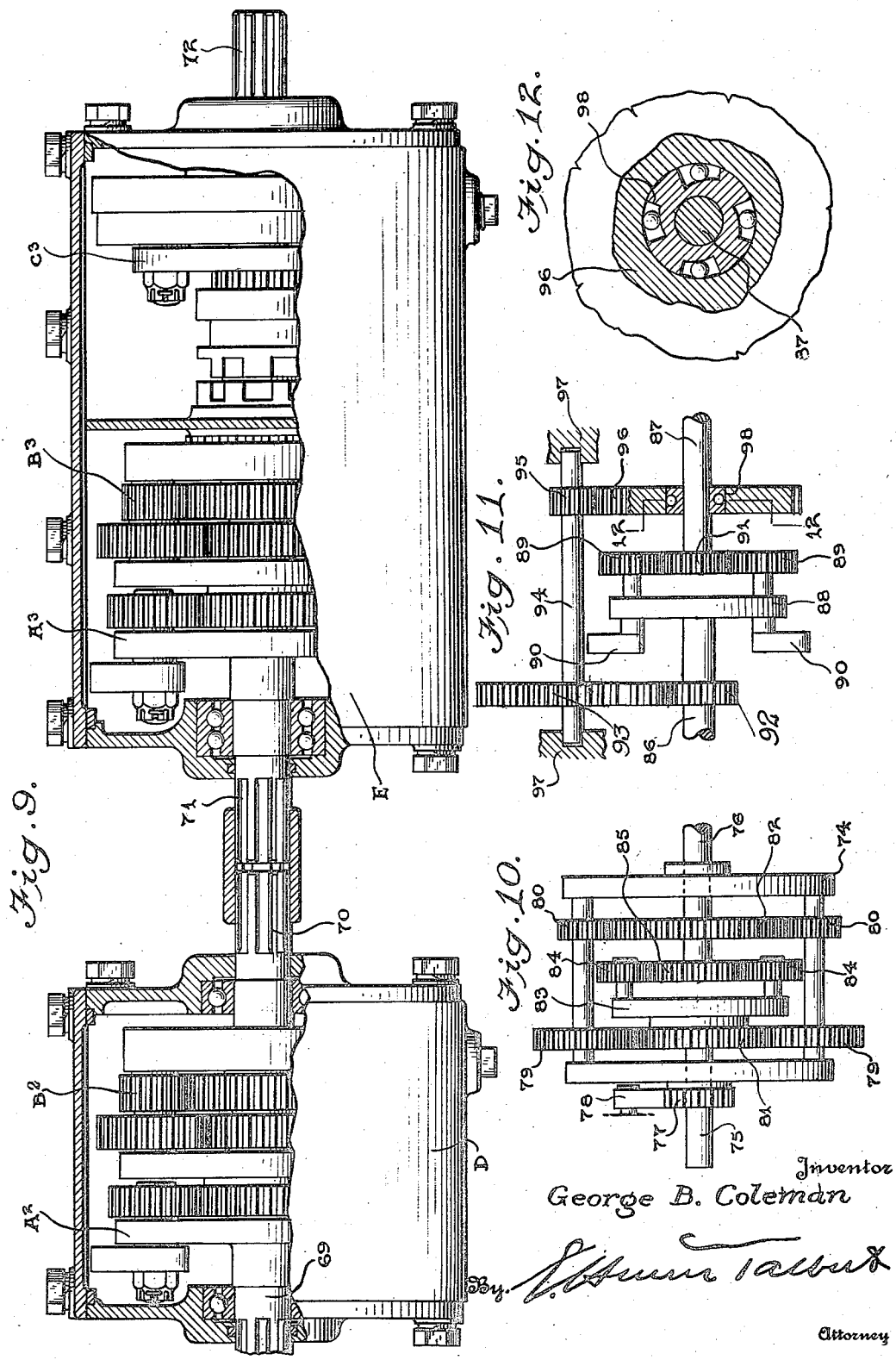
Inventor
George B. Coleman
Attorney Patented July 16, 1929.

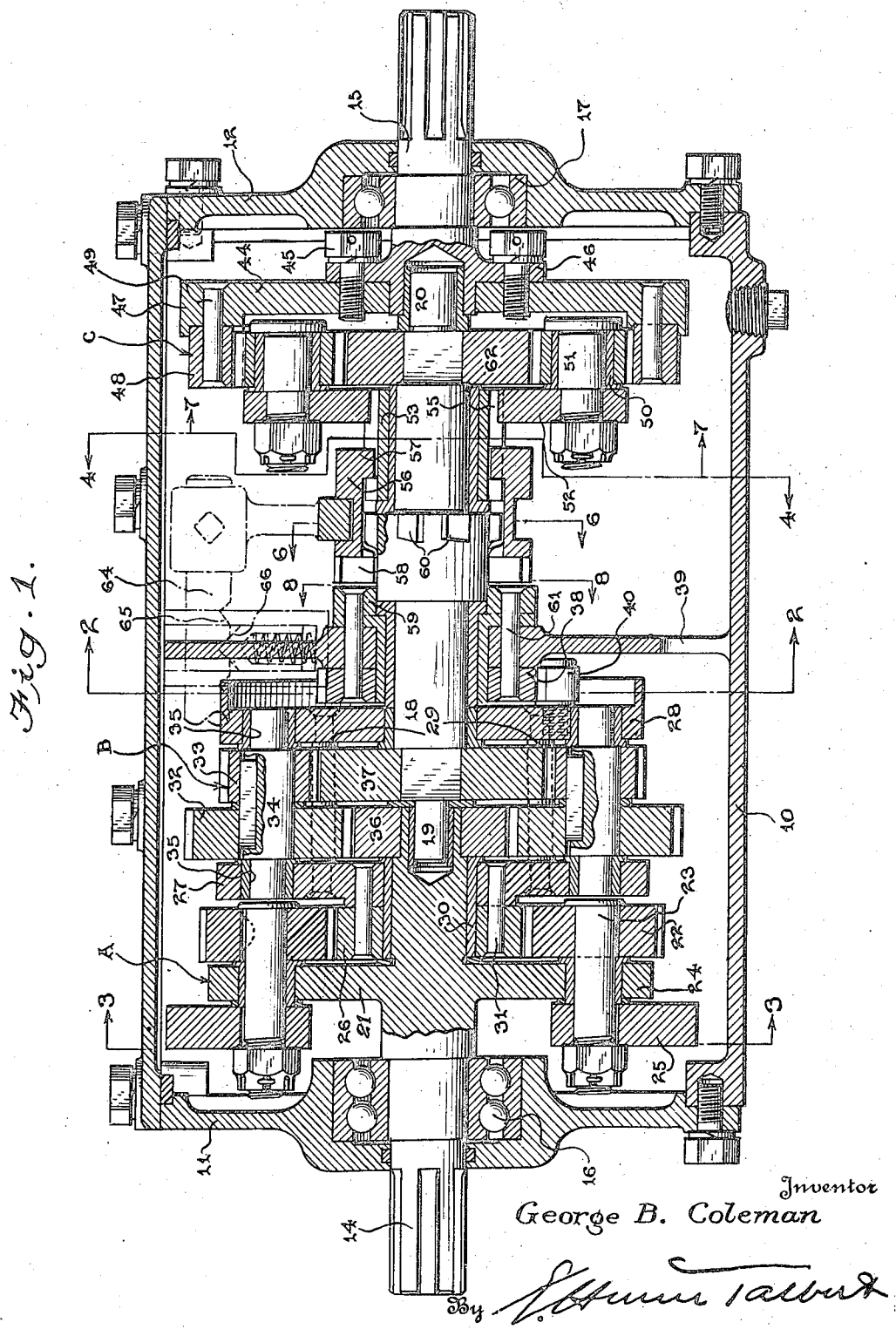

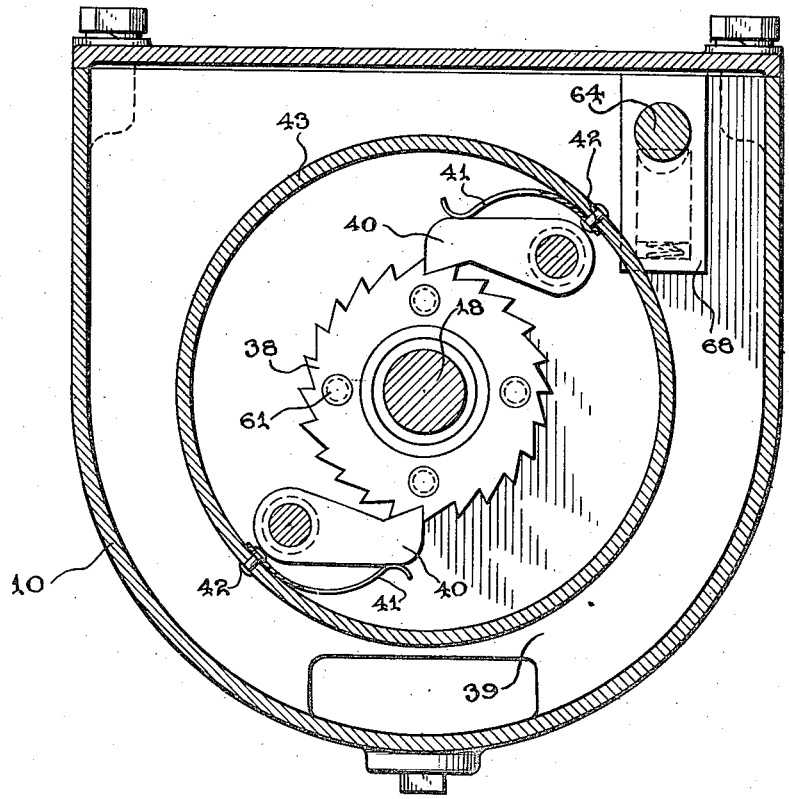
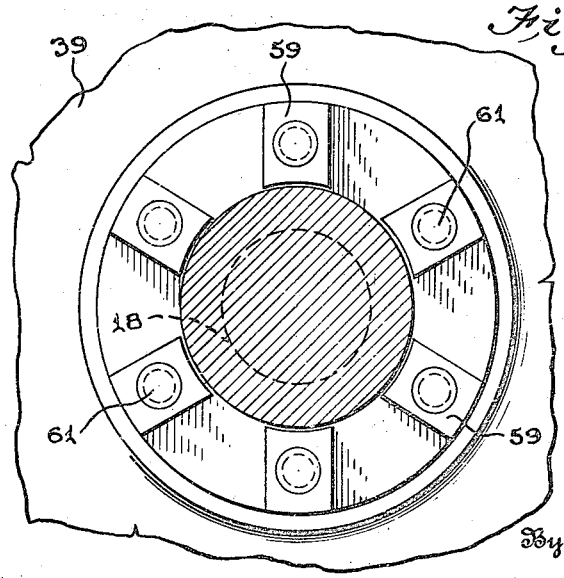

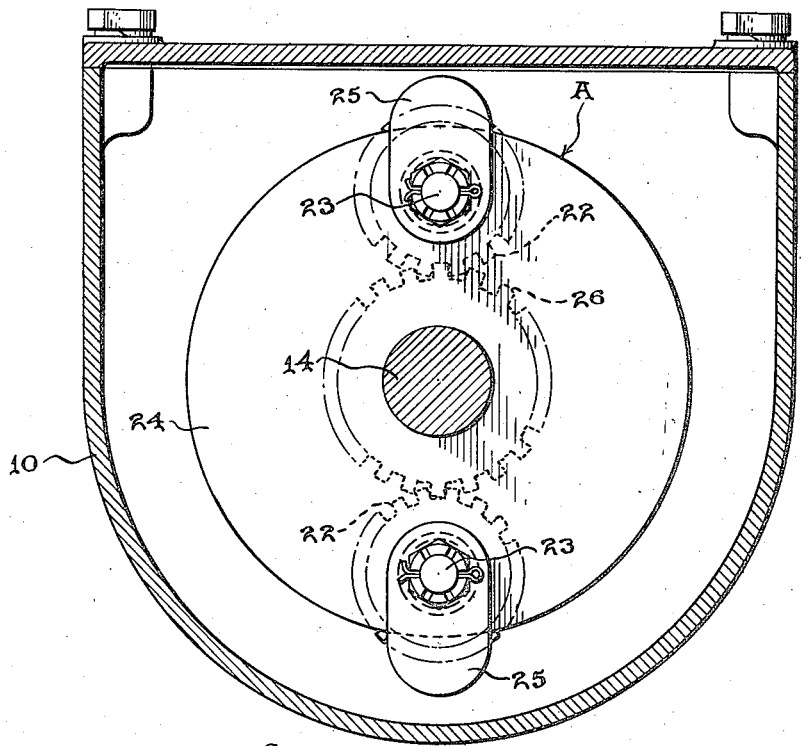
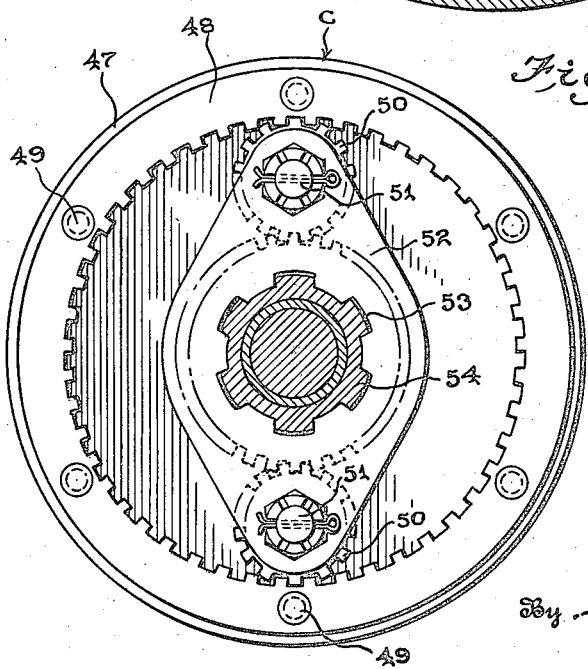

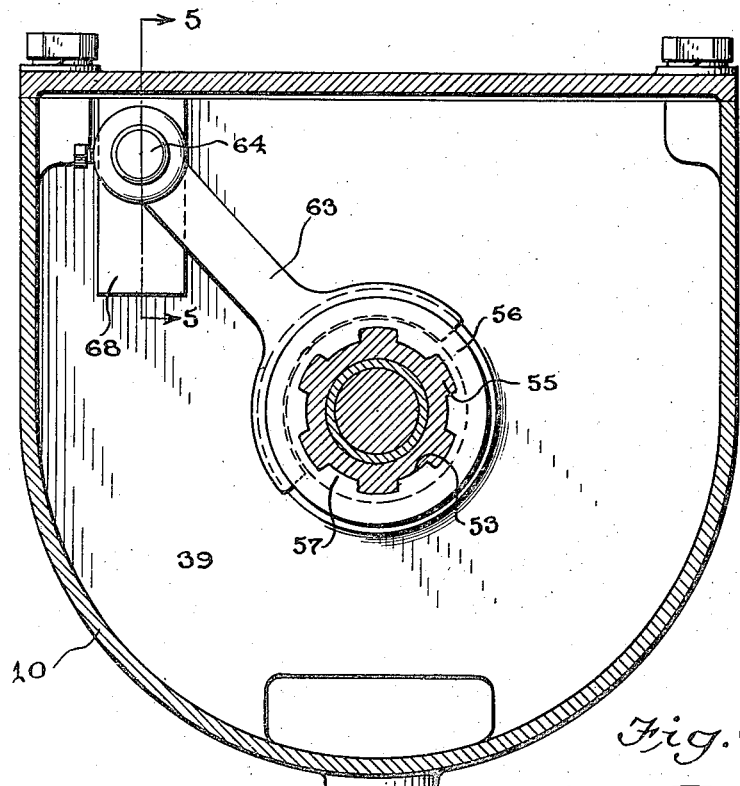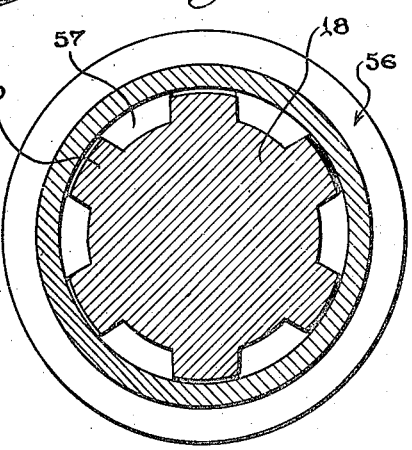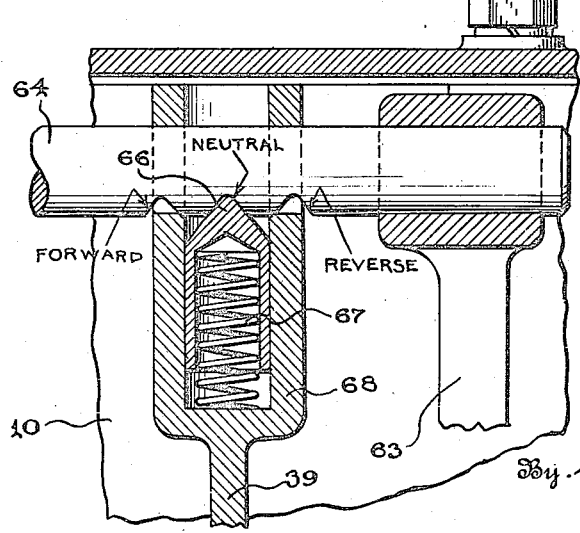

1,721,432

UNITED STATES PATENT OFFICE.

GEORGE B. COLEMAN, OF DETROIT, MICHIGAN, ASSIGNOR TO COLEMAN AUTOMATIC TRANSMISSION COMPANY, A CORPORATION OF CALIFORNIA.

TRANSMISSION.

Application filed September 29, 1925. Serial No. 59,290.

The purpose of the invention is to provide a transmission in which the members for connection respectively to the prime mover and the load are interconnected by an automatic speed reducing mechanism, so that the speed of the load may be reduced to meet any demand for increased torque, without imposing an overload on the prime mover or reducing its speed; to provide a compensating unit connected with the speed reducing mechanism for meeting quick changes in speed demands not readily met by the speed reducing mechanism; and to provide a reversing mechanism for reversing the direction of movement of the load, so that in such reverse movement, the speed changes may automatically occur as in the forward movement.

With this purpose in view, the invention consists in a construction and combination of parts of which a preferred embodiment is illustrated in the accompanying drawings, wherein:

Figure 1 is a central longitudinal sectional view of a construction embodying the invention.

Figure 2 is a transverse sectional view on the plane indicated by the line 2—2 of Figure 1.

Figure 3 is a transverse sectional view on the plane indicated by the line 3—3 of Figure 1.

Figure 4 is a transverse sectional view on the plane indicated by the line 4—4 of Figure 1.

Figure 5 is a detail sectional view on the plane indicated by the line 5—5 of Figure 4.

Figure 6 is a detail transverse sectional view on the plane indicated by the line 6—6 of Figure 1.

Figure 7 is a detail sectional view on the plane indicated by the line 7—7 of Figure 1.

Figure 8 is a detail sectional view on the plane indicated by the line 8—8 of Figure 1.

Figure 9 is a longitudinal sectional view showing a modification of the invention consisting of a concatenated arrangement of units.

Figure 10 is a central longitudinal sectional view illustrating a modified form of the invention.

Figure 11 is a central longitudinal sectional view illustrating still another modification.

Figure 12 is a detail sectional view on the line 12—12 of Figure 11.

The essential elements of the invention, which constitute the compensating unit A, the speed reducing mechanism B and the reversing mechanism C, are housed in a casing 10, in the front and rear end-cases of which are respectively journaled the shafts 14 and 15 constituting the driver and driven respectively. Both shafts are mounted in antifriction bearings, as indicated at 16 and 17, and are interconnected by a supplemental shaft 18 having stub journals 19 and 20 rotatably mounted in bearings in the rear end of the drive shaft 14 and the forward end of the driven shaft 15.

Carried by, or formed as an integral element of the drive shaft 14 (as shown) is the planet carrier 21 constituting the leader of the compensating unit, of which the followers consist of planetary pinions 22 keyed to short shafts 23 journaled in the leader 21 in bearings 24 of the latter. The shafts extend through the bearings to the opposite side of the leader and have secured to them the eccentrically mounted weights 25. The pinions 22 mesh with a spur gear 26 which is secured to the front plate 27 of the gear reduction carrier, of which the rear plate 28 is secured to the former plate through spacing posts 29.

A bearing sleeve 30 is common to the gear 26 and the front plate 27 and rotates over the shaft 14. Rivets 31 serve as a means of securing the spur gear 26 to the plate 27. The gear reduction carrier consisting of the plates 27 and 28 and spacers 29 supports the intermediate elements of the gear train, of which the spur gears 32 and pinions 33 are mounted to rotate in common, being keyed to the shafts 34 journaled in the plates 27 and 28, as indicated at 35. The spur gears 32 mesh with the spur gear 36 secured to the shaft 14 at the reduced rear end of the latter while the pinions 33 mesh with the spur gear 37 secured to the intermediate shaft 18.

The motion of the shaft 14 is communicated to the intermediate shaft 18 through the compensating unit A and the speed reducing mechanism B. At the time the prime mover is started, rotary movement is imparted to the shaft 14 and let it be assumed that the direction of rotation of the latter is right handedly as viewed from the forward end of the shaft 14. The spur gear 36 being secured to this shaft, will rotate at the same angular speed as the latter, but this speed will not immediately be communicated to the intermediate shaft 18 because of the load resistance on the driven shaft 15 with which the intermediate shaft is connected through the reversing mechanism C. This because the gears 32 and pinions 33 are free to rotate on their own axes and because of the fact that they are carried by a floating frame consisting of the plates 27 and 28 and spacers 29. The gear 36 rotating, the gears 32 will be put in motion as the pinions 33 and these latter meshing with the spur gear 37 will communicate rotary movement to the latter and thus to the shaft 18 at an angular velocity below that at which the driving shaft 14 is rotating, but in a direction the same as the latter. The power factors of the two, however, are balanced, the driving shaft having the low torque and high speed and the intermediate shaft the high torque and low speed.

The tendency of the floating carrier, however, under these conditions is to turn backward or in a direction opposite to that in which the shafts 14 and 18 are rotated, and unless some means of restraint are provided, the reverse movement of the carrier may reach a point where the speed of the intermediate shaft 18 would become nil. In the illustrated embodiment of the invention, a ratchet disk 38 is provided, being held stationary with respect to the casing by securement to a web or partition 39 which divides the casing into two compartments of which the forward houses the compensating clutch and speed reducing mechanism and the latter the reversing mechanism. Engaged with the ratchet disk are pawls 40 pivotally mounted on the rear face of the back plate 28 and held in engagement with the teeth of the ratchet disk by flat springs 41 which are riveted or otherwise secured, as indicated at 42, to a rearwardly projecting annular flange 43 carried by and forming an integral part of the back plate.

Since the ratchet disk 38 is stationary, the carrier of the speed reducing mechanism is precluded from retrograde movement and when stationary the lowest gear ratio between the driving shaft 14 and intermediate shaft 18 will obtain. As the load is accelerated, the reverse turning force applied to the gear reducing carrier will drop off with the result that the carrier will begin to move and in a direction in which the driving shaft 14 and intermediate shaft 18 are turning. This forward movement of the carrier will, however, be slow at first but the carrier will finally accelerate up to the speed of the shaft 14, the angular or turning movement of the gears 32 and pinions 33 the while gradually dropping off until, when the carrier attains the speed of the driving shaft, there will be no movement of the gears 32 and pinions 33 on their own axes and the shafts 14 and 18 will turn in synchronism.

The compensating unit A functions in this operation, it operating to accelerate the gear reducing carrier up to the speed of the driving shaft. In the initial movements of the driving shaft, the pinions 22 rotate on their own axes, since the gear reducing mechanism is at this time functioning and there is, therefore, relative angular movement between the leader 21 and the gear reduction frame. Thus the weights 25 are moved first toward and then away from the axis of rotation of the driving shaft 14 and these repeated movements interpose resistance to the turning of the pinions 22, this resistance manifesting itself in a turning force on the carrier of the gear reducing mechanism through the gear 26 with which the pinions 22 are in mesh.

In the event of a sudden increase of load, as when the invention is used in automotive vehicles and a sudden and sharp incline is encountered, the demand for a high torque and a materially reduced speed is first met by the compensating unit A, the pinions 22 beginning to rotate on their own axes and the weights being oscillated radially back and forth until the speed of the carrier of the gear reduction mechanism drops off sufficiently to meet the new conditions. The dropping off in speed of the carrier is attended with an increase in the rate of oscillation of the weights 25, with the ever-present tendency to accelerate the carrier up to synchronous speed and the eventual accomplishment of this when there is no further demand for increased torque.

Since the invention is particularly applicable to the automotive industry, it is essential that it embody a reversing mechanism, and in the illustrated embodiment this comprises a carrier plate 44 secured to the driven shaft 15 by cap screws 45 which threadingly engage the plate after having been passed through a flange 46 formed on the driven shaft. The carrier ring is formed with an annular flange 47 bounding a seat for a gear ring or annular gear 48 which is secured in any suitable manner to the carrier plate, preferably by rivets, as indicated at 49. In mesh with the annular gear 48 are the planetary pinions 50 rotatably mounted on studs 51 secured to the reverse planetary carrier 52 mounted upon and fixed with reference to a sleeve member 53, the latter being provided with a plurality of axially arranged ribs 54 engaging in corresponding notches in the eye of the carrier, as clearly indicated in the sectional view of Figure 7. The ribs are reduced in height, as indicated at 55, where they enter the carrier 52 and thus shoulders are provided constituting abutments for the carrier and the fit being preferably a forced or shrinking fit, the carrier becomes locked in position with reference to the sleeve.

In surrounding relation to the sleeve and to the supplemental or auxiliary shaft 18 is a clutch element 56 having the inwardly directed radial teeth 57 engaging in the spaces between the ribs 54. This clutch element is mounted for movement axially of the sleeve, so that the end teeth 58 may be engaged either in intercurrent relation with the teeth of a fixed clutch ring 59, or in the same relation with the radial teeth 60 on the supplemental shaft 18. The fixed clutch ring 59 is secured to the web 39 and the rivets 61 serve as the means for securing this ring in position as well as for attaching the rachet disk 38 to the web. When the clutch member 56 is shifted to engage the teeth 58 with the teeth 60 on the supplemental shaft, the sleeve 53 then becomes locked against relative angular movement with reference to the supplemental shaft and the latter being driven through the compensating clutch and the gear reducing mechanism B, the sleeve 53 will rotate with and in the same direction as the driving shaft 14. Thus the planetary carrier 52 is moved in synchronism with the shafts 14 and 18, and the pinions 52 being in mesh with the spur gear 62 which is fixed to the shaft 18, there can be no rotary movement of the pinions on their shafts and consequently the annular gear 48 will rotate in synchronism with and in the same direction as the shaft 18, carrying with it the driven shaft at a corresponding speed.

If the clutch member 56 be shifted to engage the teeth 58 with the teeth of the clutch ring 59, the sleeve 53, and therefore the planet carrier 52, becomes locked or held stationary or at rest with reference to the casing or housing. But the shaft 18 rotating, the gear 62 rotates the pinions 52 on their axes and these, engaging the annular gear 48, rotate this gear in a direction corresponding with the direction of rotation of the pinions on their axes and therefore in a reverse direction to the shaft 18 and driving shaft 14. Accordingly, the driven shaft 15 is rotated in the reverse direction.

The means for actuating the clutch member 56 consists of a shifter fork 63 carried by an axially movable shifter rod 64 which may be actuated in any acceptable manner not necessary of illustration here. The shifter rod is notched at a plurality of points, as indicated at 65, the notches being of tapered shape for engagement with the tapering nose of a locking pawl 66, the latter being spring actuated, as indicated at 67, and mounted in a guide 68 formed in the web 39. When the locking pawl is engaged in either of the outside notches 65, the clutch member 56 is either in position to lock the sleeve 53 to the shaft 18, or to lock the sleeve to the clutch ring 59. When engaged with the intermediate notch, the clutch member is in a position where the teeth 58 are disposed intermediately between the teeth 60 and the teeth of the clutch ring 59.

While a positive means has been shown to preclude retrograde or reverse movement of the carrier of the gear reducing mechanism, this is not absolutely essential to the successful operation of the invention. The compensating unit A resists retrograde or reverse turning movement of the floating frame or carrier for the reducing gearing and the means provided for positively preventing this is only imported in the event of conditions being encountered where the compensating unit might fail in this regard.

For very heavy duty, it is proposed to arrange several units in concatenation, and in Figure 9 is illustrated a construction embodying two such units. Since these units are identical in construction with the embodiment shown in Figure 1, it is unnecessary to go into detail regarding them further than to say that the unit D omits the reversing mechanism. The driving shaft 69 which is at the forward end of the unit D is connected to the prime mover and its motion is communicated to the driven shaft 70 through the compensating clutch $A^2$ and gear reducing mechanism $B^2$. The driven shaft 70 of the unit D then becomes the prime mover for the unit E, being coupled to the driving shaft 71 of the latter. The driven shaft 72 which is connected to the load receives its motion from the driving shaft 71 through the compensating unit $A^3$ and gear reducing mechanism $B^3$, reverse movement of the driven shaft being had through the reversing mechanism $C^3$ carried by the unit E. By this arrangement, a considerable variation in the torque and speed is obtained and in operation, the unit D will first function to rotate its driven shaft 70 up to the speed in synchronism with the driving shaft 69, thus leaving on the unit E the whole responsibility for any gear reduction. Finally, the unit E will function to bring the load to a speed in synchronism with the driver. It is assumed that the unit D will first function to synchronize the speeds of the driving and driven shafts because of its having less frictional resistance due to the omission of the reversing mechanism, but whether it or the unit E first functions makes no difference as it is obvious that one will follow after the other and the same result is obtained irrespective of which first functions.

In the modification shown in Figure 10, the carrier frame 74 is carried by and floats upon the driving and driven shafts 75 and 76, the frame being provided with a ratchet wheel 77 engaged by a pawl 78 to prevent retrograde movement of the frame. The pawl is designed to be mounted on some fixed or immovable part as the wall of the casing or housing enclosing the mechanism. The frame carries the planetary gears 79 and pinions 80, the former meshing with a gear 81 carried by the driving shaft 75 and the latter meshing with a gear 82 carried by the driven shaft 76. The compensating unit in this construction consists of a leader 83 carried by the driving shaft and provided with weighted planetary followers 84 in the form of pinions meshing with a gear 85 carried by the driven shaft. In this construction, when the driving shaft is put in motion, the driven shaft is also set in motion but at a reduced speed due to the gear train 81, 79, 80 and 82. There is also a tendency to turn the driven shaft through the compensating unit consisting of the leader 83, the followers 84 and the gear 85. Since the two mechanisms individually rotate the driven shaft at different speeds, the actual speed is a compromise or resultant of the two. As the load to which the driven shaft is connected is put in motion, the torque requirements are reduced and the load is finally accelerated up to the speed in synchronism with the driving shaft, when the frame 74 is moving in synchronism with the two and the compensating unit ceases to function, the weights on the followers 84 occupying their outermost positions, that is, rotating in their greatest orbit. As the demand for increased torque appears, it is met either by the gear reducing mechanism or by the compensating unit or by both.

In the modification shown in Figure 11, the driving and driven shafts 86 and 87 are operatively connected by a compensating unit consisting of the leader 88 mounted on the driving shaft and carrying planetary follower pinions 89 actuating oscillating weights 90. The follower pinions mesh with a gear 91 carried by the driven shaft. In addition, the two shafts are operatively connected to a gear reducing mechanism consisting of a gear 92 carried by the driving shaft and meshing with a pinion 93 on a countershaft 94, the latter carrying a pinion 95 meshing with a gear 96 carried by the driven shaft. The countershaft is rotatably mounted in a fixed part of the mechanism, such as the frame 97 and the pinions 93 and 95 are keyed to this shaft. The gear 92 is keyed or otherwise secured to the driving shaft but the gear 96 is provided with an over-running clutch 98 effecting its connection with the driven shaft. This overrunning clutch may be of any acceptable form and in the illustrated embodiment is shown as of the ball type. With this form of clutch, as long as turning movement is imparted to the driven shaft 87 through the gear 96, the clutch functions to lock the gear to the shaft. Thus, in starting, the gear train 92, 93, 95 and 96 functions to start the load, since the compensating unit is not readily adapted to do this. As the load is finally brought up to speed through the gear reducing train, the clutch functions and when the torque demand on the driven shaft 87 is dropped to a point where the oscillating weights 90 may move in their greatest orbit, the driven shaft is actuated direct from the driving shaft through the compensating unit, since the pinions 89 will at this time cease to rotate on their own axis and, being engaged with the gear 91, will rotate it and the driven shaft 87 at the speed of the leader 88 and therefore at the speed of the driving shaft 86. Under these conditions, the clutch 98 permits the driven shaft 87 to over-run the gear 96 in angular speed.

The invention having been described, what is claimed as new and useful is:

1. A transmission comprising driving and driven members, a bodily rotatable speed reducing mechanism operatively connected with the driven member, and centrifugally controlled planetary elements actuated by the driving member and operatively connected with the speed reducing mechanism to impose an intermittent bodily forward turning force on the same.

2. A transmission comprising driving and driven members, a bodily rotatable speed reducing mechanism operatively connecting the two, and a compensating unit comprising a leader and a follower, of which the former is connected with the driving member and the latter with the speed reducing mechanism, the follower being bodily movable with the leader, continuously impelled forwardly by the same and having an orbital movement with respect to the speed reducing mechanism, the follower being mounted for axial rotation and having means yieldingly resisting such rotation.

3. A transmission comprising driving and driven members, a bodily rotatable speed reducing mechanism operatively connecting the two, and a compensating unit comprising a leader and a follower, of which the former is connected with the driving member and the latter with the speed reducing mechanism, the follower being bodily movable with the leader, continuously impelled forwardly by the same and having an orbital movement with respect to the speed reducing mechanism, and a speed controlled governor for the follower.

4. A transmission comprising driving and driven members, a bodily rotatable speed reducing mechanism operatively connecting the two, and a compensating unit comprising a leader and a follower, of which the former is connected with the driving member and the latter with the speed reducing mechanism, the follower being bodily movable with the leader, continuously impelled forwardly by the same and having an orbital movement with respect to the speed reducing mechanism, and a speed controlled governor for and carried by the follower.

5. A transmission comprising driving and driven members, a bodily rotatable speed reducing mechanism operatively connecting the two and comprising a rotary frame and planetary gears in mesh with the gears of the driving and driven members, and a compensating unit carried by the driving member and tending to accelerate the rotary frame in the direction of and up to the speed of the driving member, said compensating unit comprising orbital members subject to bodily rotation by the driving member and axial rotation by the driven member, said orbital members having means to resist their axial rotation.

6. A transmission comprising driving and driven members, a bodily rotatable speed reducing mechanism operatively connecting the two and comprising a rotary frame and planetary gears meshing with gears on the driving and driven members, and a compensating unit consisting of a leader carried by the driving member and planetary followers carried by the leader and operatively connected with the rotary frame to rotate the latter in the direction of the driving member but at varying speeds dependent on the lead on the driven member, said followers being axially rotatable but provided with means to resist such rotation.

7. A transmission comprising driving and driven members, a bodily rotatable speed reducing mechanism operatively connecting the two and comprising a rotary frame and planetary gears meshing with gears on the driving and driven members, and a compensating unit consisting of a leader carried by the driving member and planetary followers carried by the leader and operatively connected with the rotary frame to rotate the latter in the direction of the driving member but at varying speeds dependent on the load on the driven member, said planetary followers being centrifugally controlled.

8. A transmission comprising driving and driven members, a bodily rotatable speed reducing mechanism operatively connecting the two and comprising a rotary frame and planetary gears meshing with gears on the driving and driven members, a compensating unit consisting of a leader carried by the driving member and planetary followers carried by the leader and operatively connected with the rotary frame to rotate the latter in the direction of the driving member but at varying speeds dependent on the load on the driven member said planetary followers being centrifugally controlled, and positive means to preclude retrograde movement of said rotary frame.

9. A transmission comprising driving and driven members, a bodily rotatable speed reducing mechanism operatively connecting the two and comprising a rotary frame and planetary gears meshing with gears carried by the driving and driven members, a compensating unit comprising a leader carried by the driving member and planetary followers consisting of gears carried by the leader and meshing with a gear carried by said rotary frame, and weights carried by said planetary follower gears and mounted eccentrically of the axis thereof.

10. A transmission comprising driving and driven members, a bodily rotatable speed reducing mechanism operatively connecting the two and comprising a rotary frame and planetary gears meshing with gears on the driving and driven members, positive means for precluding movement of the rotary frame in one direction, and a speed responsive compensating unit operatively connected with the rotary frame and tending intermittently to accelerate the same in the opposite direction, said speed responsive unit comprising orbitally movable axially retarded gears driven by the driver and operatively connected with said rotary frame.

In testimony whereof he affixes his signature.

GEORGE B. COLEMAN.